United States Patent [19]

Sasakura et al.

[11] Patent Number: 4,557,731
[45] Date of Patent: Dec. 10, 1985

[54] METHOD FOR DYEING BLENDED FIBER MATERIALS OF CELLULOSE FIBER AND AMIDE NITROGEN-CONTAINING FIBER WITH MONO- AND DI-FUNCTIONAL REACTIVE DYES

[75] Inventors: Masaaki Sasakura, Nabari; Kunihiko Imada, Sakai, both of Japan

[73] Assignee: Sumitomo Chemical Company, Limited, Osaka, Japan

[21] Appl. No.: 561,832

[22] Filed: Dec. 15, 1983

[30] Foreign Application Priority Data

Dec. 23, 1982 [JP] Japan ................................. 57-234058

[51] Int. Cl.$^4$ ........................... D06P 1/38; D06P 3/87
[52] U.S. Cl. ........................................... 8/531; 8/543; 8/549; 8/917; 8/918; 8/924
[58] Field of Search ............................ 8/543, 531, 549

[56] References Cited

U.S. PATENT DOCUMENTS

| | | |
|---|---|---|
| 3,627,749 | 12/1971 | Ackermann et al. .................. 8/549 |
| 3,628,905 | 12/1971 | Kirschner et al. ...................... 8/543 |
| 4,283,196 | 8/1981 | Wenghoefer et al. ................. 8/531 |
| 4,286,962 | 9/1981 | Ehrig et al. ............................ 8/549 |
| 4,294,579 | 10/1981 | Hendricks et al. ..................... 8/549 |
| 4,297,101 | 10/1981 | van der Eltz et al. ................. 8/531 |
| 4,300,902 | 11/1981 | Connor .................................. 8/529 |
| 4,341,699 | 7/1982 | Tezuka et al. ....................... 260/153 |
| 4,378,313 | 3/1983 | Kayane et al. ...................... 260/153 |
| 4,439,206 | 3/1984 | Hildebrand et al. ................... 8/543 |
| 4,443,224 | 4/1984 | Opitz ..................................... 8/527 |

FOREIGN PATENT DOCUMENTS

| | | |
|---|---|---|
| 36582 | 9/1981 | European Pat. Off. . |
| 40790 | 12/1981 | European Pat. Off. . |
| 52985 | 6/1982 | European Pat. Off. . |
| 115705 | 8/1984 | European Pat. Off. . |
| 875163 | 8/1961 | United Kingdom . |
| 1408025 | 10/1975 | United Kingdom . |
| 2028876 | 3/1980 | United Kingdom . |

OTHER PUBLICATIONS

Venkataraman's "The Chemistry of Synthetic Dyes," vol. VI, Academic Press, 1972, pp. 198-200, 339-346 and 375.

Primary Examiner—A. Lionel Clingman
Attorney, Agent, or Firm—Stevens, Davis, Miller & Mosher

[57] ABSTRACT

A blended fiber material of cellulose fiber and nitrogen-containing fiber is dyed by a one-bath one-step dyeing method, which comprises contacting the material with a dye bath containing both a reactive dye having two or more fiber-reactive groups different from each other and a reactive dye having one fiber reactive dye, whereby a dyed product having an excellent wet fastness is obtained even in a single manner.

15 Claims, No Drawings

METHOD FOR DYEING BLENDED FIBER MATERIALS OF CELLULOSE FIBER AND AMIDE NITROGEN-CONTAINING FIBER WITH MONO- AND DI-FUNCTIONAL REACTIVE DYES

The present invention relates to a method for dyeing blended fiber materials made up of cellulose fibers and nitrogen-containing fibers.

More specifically, this invention relates to a method for dyeing said materials by a one-bath dyeing method.

Cellulose fibers and nitrogen-containing fibers have been dyed with use of direct dyes, reactive dyes, vat dyes, sulfur dyes and the like, or with use of acid dyes, acid mordant dyes, reactive dyes and the like, respectively.

However, blended fiber materials of cellulose fibers and nitrogen-containing fibers, which are hereinafter referred to as C/N fiber materials for brevity, can hardly be dyed in a single manner, because of the different dyeing conditions required for dyeing the respective fibers. In order to dye the C/N fiber materials commercially, there have heretofore been applied, for example, a two-bath, two-step dyeing method which comprises subjecting the C/N fiber materials to acid bath dyeing in order to dye the nitrogen-containing fibers and then to another bath dyeing in order to dye the cellulose fibers; an improved two-bath, two-step dyeing method which comprises subjecting the C/N fiber materials to dyeing with vat dyes, sulfur dyes or the like to dye the cellulose fibers and then dyeing with acid dyes, acid mordant dyes or the like to dye the nitrogen-containing fibers; a one-bath, two-step dyeing method which comprises carrying out the dyeing with reactive dyes first under conditions for dyeing the cellulose fibers and second under conditions for dyeing the nitrogen-containing fibers; and other methods using a resisting agent or applying a pre-treatment.

However, according to said two-bath, two-step dyeing method, the dyed product has inferior wet fastness, and the improved two-bath, two-step dyeing method has a problem such that the protein fibers deteriorate during the dyeing with the vat dyes or sulfur dyes due to the strong alkali. The dyeing method utilizing reactive dyes can hardly be standardized, because dyeing conditions such as dyeing temperature, pH of the dye bath, amounts of auxiliaries and the like vary depending on the kind of reactive dyes to be used. The method using a resisting agent gives a dyed product having inferior light fastness. Moreover, the aforesaid prior art methods having two-step procedures require a long period of time for completion of the dyeing.

The present inventors have studied to find a method for dyeing C/N fiber materials with industrial advantages to give an excellent dyed product, and have discovered that in a dye bath containing a reactive dye having two or more fiber-reactive groups different from each other and a reactive dye having one reactive group, the former has a high affinity to cellulose fibers, and the latter has a high affinity to the nitrogen-containing fibers rather than the cellulose fibers, and that as a result of this fact the C/N fiber materials can be dyed in a single manner using this type of dye bath. The present invention is based on this discovery.

The present invention provides a method for dyeing C/N fiber materials, which comprises contacting the materials with a dye bath containing a reactive dye having two or more fiber-reactive groups different from each other, and a reactive dye having one fiber-reactive group.

Examples of the reactive dye having at least two reactive groups different from each other usable in the method of the present invention are those having one vinylsulfone type reactive group and one monohalotriazinyl group, one vinylsulfone type reactive group and one dihalotriazinyl group, one vinylsulfone type reactive group and two monohalotriazinyl groups, two vinylsulfone type reactive groups and two monohalotriazinyl groups, one monohalotriazinyl group and one dihalotriazinyl group, one dihalotriazinyl group and one dihalopyrimidinyl group, one monohalotriazinyl group and one trihalo(e.g. difluoromonochloro)pyrimidinyl group, one monochlorotriazinyl group and one monofluorotriazinyl group, and the like. In the above examples, the term "vinylsulfone type reactive group" is intended to mean a group represented by the formula, $-SO_2Y$, wherein $Y$ is a vinyl group or $-CH_2CH_2OZ$ in which $Z$ is a basic acid residue, and the preferred "halo" is chloro or fluoro. These reactive dyes are disclosed, for example, in Published Examined Japanese Patent Application Nos. 26488/1963, 18184/1964, 20240/1963 and 20235/1963, and Published Unexamined Japanese Patent Application Nos. 74619/1977, 12187/1980, 102335/1977, 72226/1979, 73828/1979 and 39672/1980, and the like.

Of these reactive dyes, particularly preferred are those having the following formula (I) or (II),

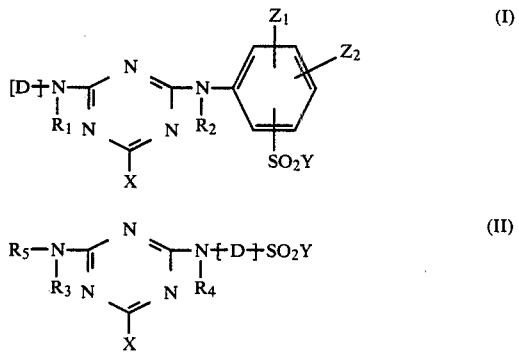

wherein $D$ is an organic dye residue, $R_1$, $R_2$, $R_3$ and $R_4$ are independently a hydrogen atom or an alkyl group, $R_5$ is a hydrogen or halogen atom or a phenyl group unsubstituted or substituted with at least one member selected from a halogen atom or a hydroxy, alkoxy, alkyl, phenyl, amino or sulfo group, $Z_1$ and $Z_2$ are independently a hydrogen atom or an alkyl, alkoxy, carboxyl or sulfo group, $X$ is a halogen atom, and $Y$ is a vinyl group or $-CH_2CH_2OZ$ in which $Z$ is a basic acid residue.

Examples of the reactive dye having one fiber-reactive group are those having the vinylsulfone type reactive group, which are, more specifically, represented by the following formula (III),

$$D'-SO_2Y \qquad (III)$$

wherein $D'$ is an organic dye residue having a sulfo group and $Y$ is as defined above, and those having a monohalotriazinyl, dihalotriazinyl, trihalopyrimidinyl (e.g. monochlorodifluoropyrimidinyl), methylsulfonylhalomethylpyrimidinyl or dihaloquinoxalinyl group. In the above examples, the preferred "halo" is chloro or fluoro. These reactive dyes may be available commercially. Of these, those having the formula (III) are preferably used.

In carrying out the method of the present invention, the dye bath may contain an alkali and an inorganic salt.

Examples of the alkali usable in the method of the present invention are alkali metal hydroxides (e.g. sodium hydroxide), alkali metal carbonates (e.g. sodium carbonate), alkali metal phosphates, (e.g. tri-sodium or potassium phosphate), alkali metal acetates, alkali metal borates, alkali metal perborates and organic bases such as tertiary amines including triethanolamine, diethylaminophenol and the like.

Examples of the inorganic salt are sodium sulfate, sodium chloride, and the like.

The cellulose fibers included in the C/N fiber materials include natural cellulose fibers such as cotton, hemp and the like, and artificial fibers such as viscose, rayon and the like.

The nitrogen-containing fibers include natural fibers such as wool, cashmere, silk and the like, and synthetic fibers such as polyamides, including nylon and the like.

The dyeing in accordance with the present invention may be carried out in a manner known as a so-called raising-temperature-exhaustion dyeing method. Concretely speaking, both the reactive dye having at least two fiber reactive groups and the reactive dye having one fiber-reactive group are dissolved in water together with the alkali and the inorganic salt in a conventional manner to prepare a dye bath. The C/N fiber materials are dipped into this dye bath at ambient temperature. The temperature is gradually raised to 40° to 80° C., and the dyeing is continued at this temperature for a sufficient period of time, for example, about 45 to 60 minutes. Thereafter, the dyed product is after-treated in a conventional manner, for example, it may be washed with water, subjected to neutralization using an acid, soaped with an aqueous solution of a detergent and then washed with water.

According to the method of the present invention, both cellulose fibers and the nitrogen-containing fibers are dyed with reactive dyes, and therefore there can be obtained a dyed product having a high fastness. Moreover, the method of the present invention is, as described above, a one-bath one-step dyeing method, and therefore it is remarkably advantageous from an economical point of view due to a drastic cut in dyeing time, water for the dyeing, chemicals, energy and the like.

Furthermore, a dyed product having a much higher fastness can be obtained, when both the reactive dye of the formula (I) or (II) and the reactive dye of the formula (III) are used, because of a high strength of the linkage between the fibers and the dyes and an excellent wash-off property due to which unreacted dyes can easily be removed in a washing procedure.

The method of the present invention is illustrated in more detail with reference to the following Examples, which are only illustrative and are not intended to limit the scope of the present invention.

EXAMPLE 1

In one liter of water were dissolved 1 g of a dye of the following formula (1), 0.6 g of a dye of the following formula (2), and 50 g of anhydrous sodium sulfate.

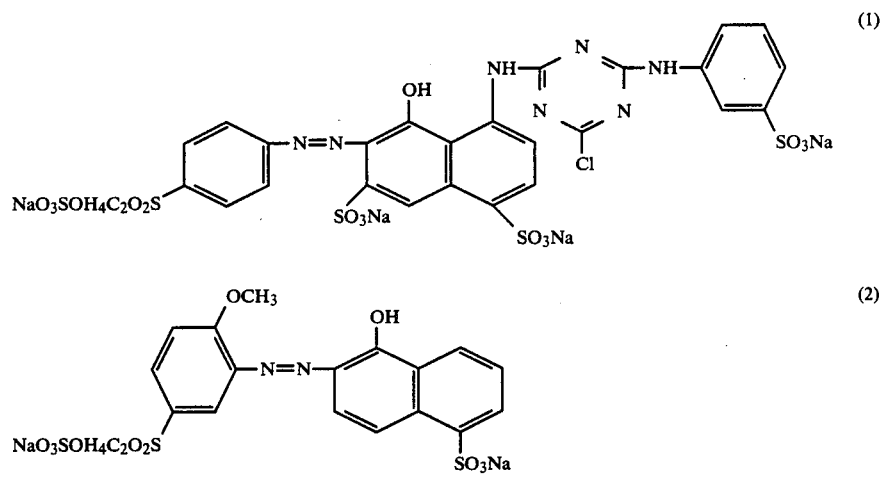

Then, 50 g of cotton/silk blended twist yarn (mixture ratio 50/50) was dipped into the solution and stirred for 15 minutes at ambient temperature. Successively, 20 g of sodium carbonate was added thereinto, and after 5 minutes, the bath was heated to a temperature of 60° C. taking over 30 minutes. Dyeing was continued for 60 minutes at this temperature. Thereafter, the dyed product was taken out, washed with water and dipped for 5 minutes in a solution containing one liter of water and 2 ml of acetic acid for neutralization. Further, the product was soaped with one liter of an aqueous solution containing 3 g of Monogen poweder (a detergent produced by Daiich Kogyo Seiyaku Co. in Japan) which was kept at 80° C., then washed with water and dried to obtain a finished product. Thus, a dyed product of a uniform and brilliant red color having an excellent wet fastness was obtained.

COMPARATIVE EXAMPLE 1 (Two-Bath Method)

In a manner similar to that of Example 1 excepting that 1.5 g of the dye having the formula (1) alone was used, dyeing was carried out to dye a cotton portion in the blended twist yarn. Thereafter, the product was dipped into a dye bath prepared by dissolving 0.2 of Acid Red 114 and 2 ml of acetic acid in one liter of water, and the bath was heated to a temperature of 80° C. Dyeing was continued for 30 minutes at this temperature to dye the remaining silk portion.

Each wet fastness of the dyed products obtained in Example 1 and Comparative Example 1 was as shown in Table 1.

TABLE 1

Fastness to washing (A-4)

|  | Change in color | Staining Cotton | Silk |
|---|---|---|---|
| Example 1 | 5 | 5 | 4–5 |
| Comparative Example 1 | 5 | 3 | 3 |

Note:
The test for assessing the fastness to washing was carried out according to JIS L-0844 A-4.

EXAMPLE 2

In one liter of water were dissolved 0.8 g of a dye having the following formula (3), 0.5 g of a dye having the following formula (4) and 50 g of anhydrous sodium sulfate.

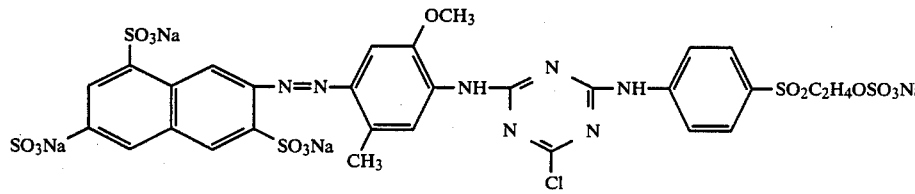
(3)

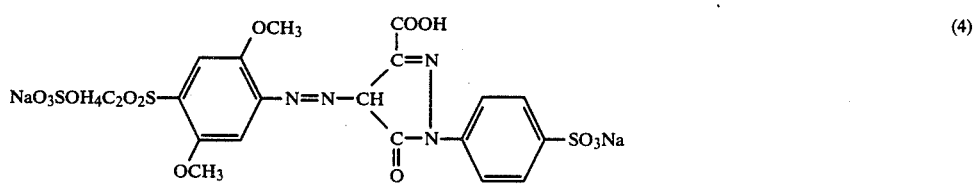
(4)

Then, 50 g of cotton/wool union yarn (mixture ratio 50/50) was dipped into the solution. The subsequent treatment was carried out in the same manner as in Example 1 to obtain a dyed product of a uniform and somewhat reddish yellow color having an excellent wet fastness.

COMPARATIVE EXAMPLE 2

Example 2 was repeated, provided that a dye having the following formula (5) was used in place of the dye having the formula (3), whereby a dyed product of a somewhat reddish yellow color was obtained.

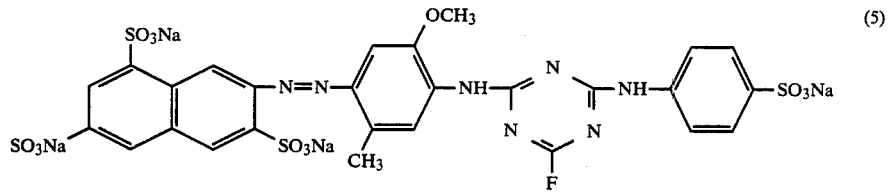
(5)

The fastnesses of the dyed products obtained in Example 2 and Comparative Example 2 was as shown in Table 2.

TABLE 2

|  | Stability of dyed product | | |
|---|---|---|---|
|  | Change in color | Staining Cotton | Wool |
| Example 2 | 4–5 | 5 | 4–5 |
| Comparative Example 2 | 4–5 | 5 | 2 |

Note:
The stability of dyed product was tested in such manner that the dyed product was dipped in a 1% acetic acid solution for 30 minutes at 37° C. ± 2° C., and then kept for 4 hours at that temperature within a perspirometer.

EXAMPLE 3

In one liter of water were dissolved 2.0 g of a dye of the following formula (6), 1.0 g of the dye of the formula (4), 3.0 g of a dye of the following formula (7) and 50 g of anhydrous sodium sulfate.

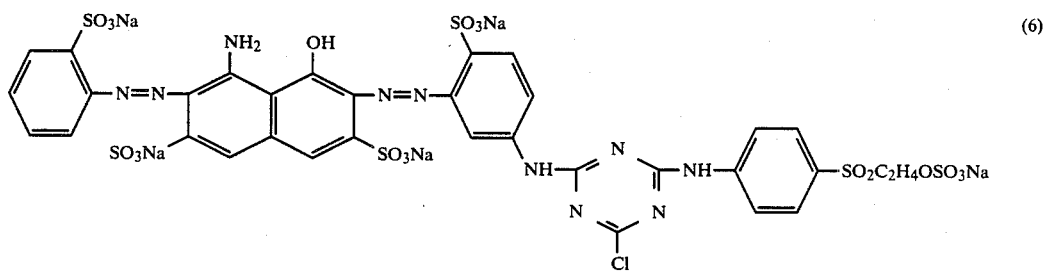
(6)

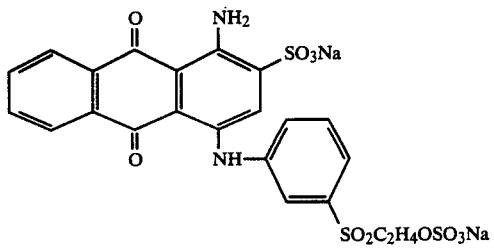

(7)

Then, 50 g of cotton/wool union yarn (mixture ratio 50/50) was dipped into the solution and treated for 15 minutes at ambient temperature. Successively, 10 g of trisodium phosphate was added thereinto. After 5 minutes, the bath was heated to a temperature of 60° C. over 30 minutes, and dyeing was carried out in the same manner as in Example 1. The dyed product was then washed with water, neutralized, soaped, water-washed and then dried also in the same manner as in Example 1. Thus, a dyed product of a navy blue color having an excellent wet fastness was obtained.

COMPARATIVE EXAMPLE 3

In a manner similar to that of Example 3 excepting that 2.0 g of the dye of the formula (6) alone was used, the dyeing was carried out to dye a cotton portion in the union yarn. Then, the product was dipped into a dye bath prepared by dissolving 0.3 g of Acid Blue 113 and 2 ml of acetic acid in one liter of water. Dyeing was carried out for 30 minutes at a temperature of 100° C. to dye the remaining wool portion. The wet fastness of the dyed product obtained was inferior to that of the dyed product of Example 3.

What is claimed is:

1. A method for dyeing a blended fiber material made up of cellulose fiber and nitrogen-containing fiber selected from the group consisting of natural nitrogen-containing fibers and synthetic polyamide fibers, which comprises contacting the material with a dye bath containing a reactive dye having two or more fiber-reactive groups different from each other and a reactive dye having one fiber-reactive group, whereby the material can be dyed by a one-bath, one-step method.

2. The method according to claim 1, wherein the reactive dye having two or more fiber-reactive groups different from each other comprises a single reactive dye selected from the group consisting of reactive dyes having, as the fiber-reactive groups, one vinylsulfone type reactive group and one monohalotriazinyl group, one vinylsulfone type reactive group and one dihalotriazinyl group, one vinylsulfone type reactive group and two monohalotriazinyl groups, two vinylsulfone type reactive groups and two monohalotriazinyl groups, one monohalotriazinyl group and one dihalotriazinyl group, one dihalotriazinyl group and one dihalopyrimidinyl group, one monohalotriazinyl group and one trihalopyrimidinyl group, or one monochlorotriazinyl group and one monofluorortriazinyl group.

3. The method according to claim 1, wherein the reactive dye having two or more fiber-reactive groups different from each other is selected from the group consisting of reactive dyes represented by the formulas (I) and (II),

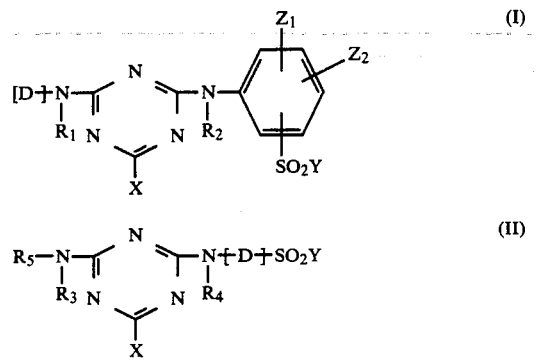

wherein D is an organic dye residue; $R_1$, $R_2$, $R_3$, and $R_4$ are independently hydrogen or alkyl; $R_5$ is hydrogen, halogen, or phenyl unsubstituted or substituted with at least one member selected from the group consisting of halogen, hydroxy, alkoxy, alkyl, phenyl, amino and sulfo; $Z_1$ and $Z_2$ are independently hydrogen, alkyl, alkoxy, carboxyl or sulfo; X is halogen; and Y is a vinyl group or $-CH_2CH_2OZ$ in which Z is a basic acid residue.

4. The method according to claim 1, wherein the reactive dye having one fiber-reactive group comprises a reactive dye having a single fiber-reactive group selected from the group consisting of vinylsulfone, monohalotriazinyl, dihalotriazinyl, trihalopyrimidinyl, methylsulfonylhalomethylpyrimidinyl and dihaloquinoxalinyl.

5. The method according to claim 1, wherein the reactive dye having one fiber-reactive group is represented by the formula (III), $$D'-SO_2Y \qquad (III)$$

wherein D' is an organic dye residue having a sulfo group and Y is a vinyl group or $-CH_2CH_2OZ$ in which Z is a basic acid residue.

6. The method according to claim 1, wherein the contacting is carried out in the presence of an alkali and an inorganic salt.

7. The method according to claim 6, wherein the alkali is at least one member selected from the group consisting of alkali metal hydroxides, alkali metal carbonates, alkali metal phosphates, alkali metal acetates, alkali metal borates, alkali metal perborates and organic bases.

8. The method according to claim 6, wherein the inorganic salt is one member selected from the group consisting of sodium sulfate and sodium chloride.

9. The method according to claim 1, wherein the contacting is carried out at a temperature of 40° to 80° C.

10. The method according to claim 2, wherein said reactive dye having two or more fiber-reactive groups is:

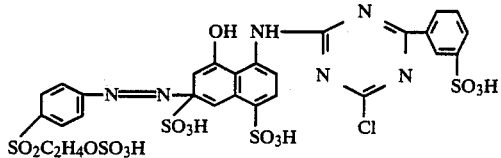

11. The method according to claim 2, wherein said reactive dye having two or more fiber-reactive groups is:

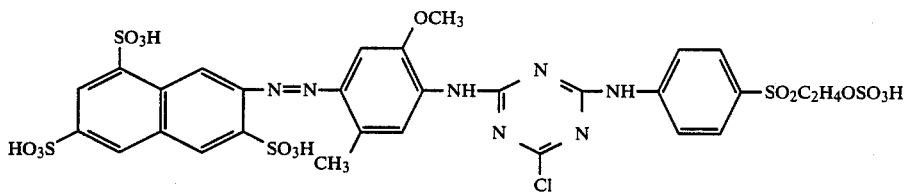

12. The method according to claim 2, wherein said reactive dye having two or more fiber-reactive groups is:

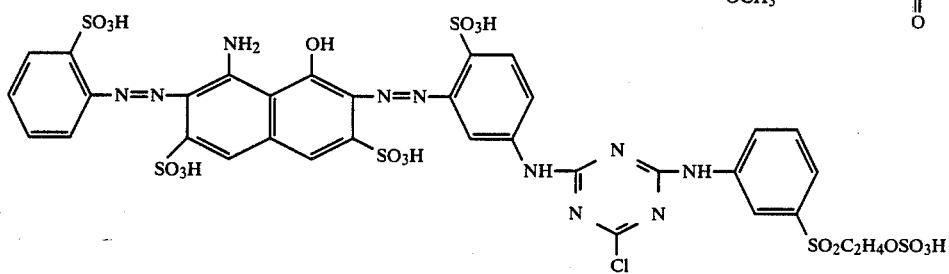

13. The method according to claim 5, wherein said reactive dye having one fiber-reactive group is:

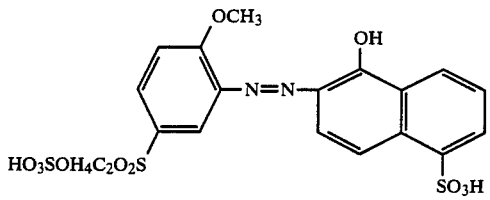

14. The method according to claim 5, wherein said reactive dye having one fiber-reactive group is:

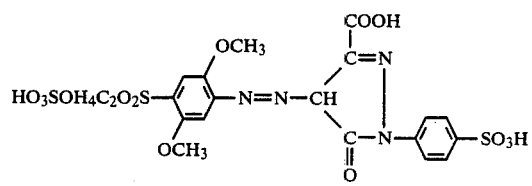

15. The method according to claim 5, wherein said reactive dye having one fiber-reactive group is:

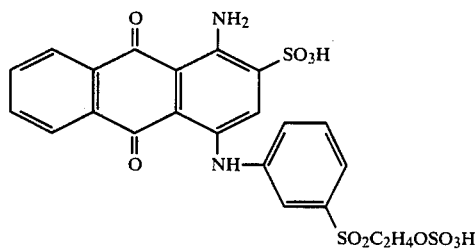

* * * * *